(12) United States Patent
Stavropoulos et al.

(10) Patent No.: US 9,386,069 B2
(45) Date of Patent: Jul. 5, 2016

(54) MEDIA EXPOSURE DATA COLLECTION AND SECURITY

(75) Inventors: John Stavropoulos, Edison, NJ (US); Anand Jain, Elliott City, MD (US); Wendell Lynch, East Lansing, MI (US); Vladimir Kuznetsov, Elliott City, MD (US); Jack Crystal, Owings Mills, MD (US); Jason Bolles, Highland, MD (US); William John McKenna, Barrington, IL (US); David Gish, Riverdale, NJ (US); Mark Richardson, Columbia, MD (US); Alan Neuhauser, Silver Spring, MD (US)

(73) Assignee: The Nielsen Company (US), LLC, New York, NY (US)

( * ) Notice: Subject to any disclaimer, the term of this patent is extended or adjusted under 35 U.S.C. 154(b) by 300 days.

(21) Appl. No.: 13/338,479

(22) Filed: Dec. 28, 2011

(65) Prior Publication Data
US 2013/0174231 A1    Jul. 4, 2013

(51) Int. Cl.
*G06F 15/16*    (2006.01)
*H04L 29/08*    (2006.01)
*H04L 29/06*    (2006.01)

(52) U.S. Cl.
CPC ............ *H04L 67/02* (2013.01); *H04L 63/0428* (2013.01); *H04L 63/08* (2013.01)

(58) Field of Classification Search
USPC .......................................................... 726/5
See application file for complete search history.

(56) References Cited

U.S. PATENT DOCUMENTS

| | | | |
|---|---|---|---|
| 2005/0273802 A1* | 12/2005 | Crystal et al. | 725/13 |
| 2006/0085351 A1 | 4/2006 | Hug | |
| 2006/0193270 A1 | 8/2006 | Gehasie | |
| 2007/0138251 A1* | 6/2007 | Mattlin et al. | 235/375 |
| 2009/0119695 A1* | 5/2009 | Ramaswamy | G06Q 30/0201 725/13 |
| 2009/0193052 A1* | 7/2009 | FitzGerald et al. | 707/102 |
| 2009/0298480 A1* | 12/2009 | Khambete | G06F 17/30699 455/414.1 |
| 2009/0304082 A1 | 12/2009 | Radhakrishnan | |
| 2009/0305667 A1* | 12/2009 | Schultz | H04L 63/08 455/410 |
| 2010/0131969 A1* | 5/2010 | Tidwell et al. | 725/14 |
| 2012/0109709 A1* | 5/2012 | Fordyce et al. | 705/7.29 |

FOREIGN PATENT DOCUMENTS

GB    2427055 A  * 12/2006 ............... G07C 9/00

OTHER PUBLICATIONS

International Search Report & Written Opinion of PCT/US12/71969 dated Mar. 8, 2013.
Patent Cooperation Treaty, "International Preliminary Report on Patentability," issued in connection with International Application No. PCT/US2012/071969, Jul. 14, 2014 (1 page).

\* cited by examiner

*Primary Examiner* — Esther B Henderson
(74) *Attorney, Agent, or Firm* — Hanley, Flight & Zimmerman, LLC (57) ABSTRACT

Systems and methods are disclosed for securely transferring research data relating to media exposure data, such as radio, television, streaming media and the Internet. A plurality of portable computing devices seek and bond to a collector via Bluetooth in a specific area, such as a household. The collector authenticates itself with each of the portable computing devices and vice versa where the collector arranges a secure research data transfer session with each respective device using exchanged authentication files. As each secure session is made, each portable computing device transmits stored research data during the session.

20 Claims, 5 Drawing Sheets

MEDIA EXPOSURE DATA COLLECTION AND SECURITY

TECHNICAL FIELD

The present disclosure is directed to processor-based audience analytics. More specifically, the disclosure describes systems and methods for utilizing short-range communications to securely transfer research data related to user media data exposure.

BACKGROUND INFORMATION

Interest in measuring media data exposure has been growing in recent years, with many seeking to determine the numbers and types of individuals that are exposed to or consume media data. The terms "media data" and "media" as used herein mean data which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, audio/video, text, images, animations, databases, broadcasts, displays (including but not limited to video displays), web pages and streaming media. To date, a number of improvements have been made for counting aggregate numbers of users that may have been exposed to media data.

However, one area where improvements are needed is the efficient and secure transfer of research data in households and the like. The term "research data" as used herein means data comprising (1) data concerning usage of media data, (2) data concerning exposure to media data, and/or (3) market research data. Presently, research data collected from users require extended storage periods, where communication of the collected research data takes place over a wired connection or wirelessly, typically through a wireless cellular connection. In the case of cellular communication, this can result in inefficient and insecure communication. Furthermore, significant amounts of research data may be sent over the wireless cellular connection, which typically results in increased costs for the user.

BRIEF SUMMARY

Accordingly, apparatuses, systems and methods are disclosed for computer-implemented techniques for securely receiving research data relating to media data exposure, wherein a first and second authentication file is received in a collector from a portable computing device via a Bluetooth connection, wherein the second authentication file is in a different format from the first authentication file and the second authentication file contains identification information relating to the portable computing device. The second authentication file is validates using at least the first authentication file, where a session authentication file is transmitted to the portable computing device, wherein the session authentication file defines a research data transfer session that is valid over a predetermined period of time. Subsequently research data relating to media data exposure from the portable computing device during the research data transfer session period.

Under another embodiment, a computer-implemented technique is disclosed for securely communicating research data relating to media data exposure in a portable computing device utilizing Bluetooth communication, comprising the steps of: performing an identification procedure to identify a collector; receiving and verifying a collector authentication file (CIA) when a collector has been identified; transmitting a portable computing device authentication file (MIA) to the collector when the CIA file is verified, wherein the MIA contains identification information relating to the portable computing device; receiving and verifying a key in the portable computing device from the collector after the MIA file is transmitted; receiving a session authentication file (CSA) from the collector, wherein the validation of the CSA signifies the start of a research data transfer session; and transmitting research data stored on the portable computing device to the collector.

Under yet another embodiment, a collector is disclosed for receiving research data, comprising: a processor; a memory, operatively coupled to the processor; and a communications interface, operatively coupled to the processor, wherein the communications interface is configured to communicate via a Bluetooth connection, wherein the collector receives a first authentication file and a second authentication file via the communications interface, wherein the second authentication file is in a different format from the first authentication file and wherein the second authentication file contains identification information relating to a portable computing device, wherein the processor verifies the second authentication file is valid using the first authentication file, and wherein the communications interface transmits a session authentication file if the verification is valid, wherein the session authentication file defines a research data transfer session that is valid over a predetermined period of time, and wherein the processor receives research data relating to media data exposure via the communications interface during the period of the data transfer session.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
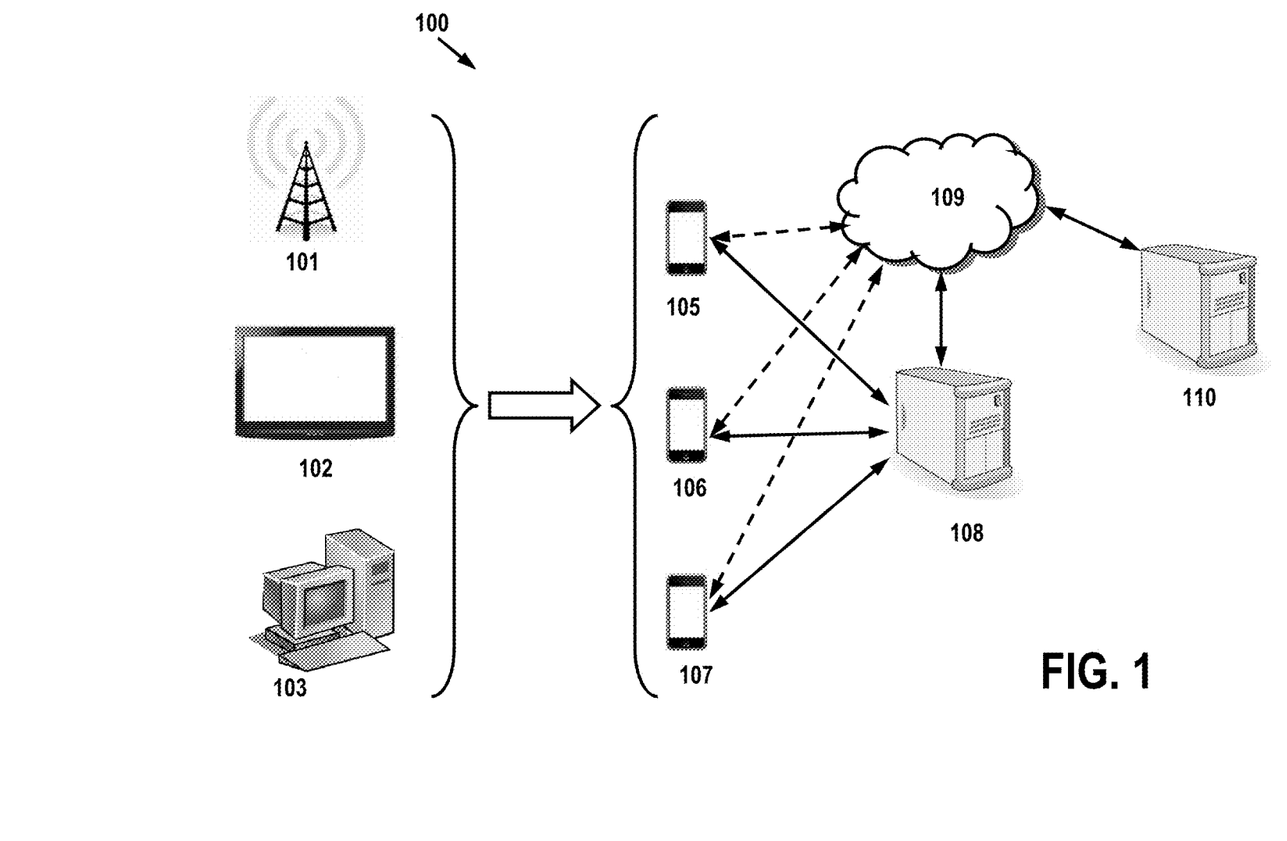
FIG. 1 illustrates an exemplary system under one embodiment, where media data is provided to portable computing devices communicatively coupled to a network and collector.

FIG. 1 illustrates an exemplary system 100, where media data 104 is provided from multiple sources, including broadcast audio 101, television, 102 and computer networks 103, such as the Internet. Media data 104 is received at portable computing devices 105-107, wherein portable computing devices 105-07 generate research data and/or receive research data from a suitably equipped device producing media data (e.g., computer, set-top box, etc.). In one embodiment, media data is provided in the form of audio, where at least one of portable computing devices 105-17 are equipped with microphones or suitable data connections to capture the reproduced audio. Specially designed software would reside on a portable computing device to allow it to produce research data relating to the broadcast. Under one embodiment, research data comprises ancillary codes detected from the audio signal media data 104. The ancillary codes may be encoded and detected using any of the techniques found in U.S. Pat. No. 5,450,490 and U.S. Pat. No. 5,764,763 (Jensen et al.) in which information is represented by a multiple-frequency code signal which is incorporated into an audio signal based upon the masking ability of the audio signal. Additional examples include U.S. Pat. No. 6,871,180 (Neuhauser et al.) and U.S. Pat. No. 6,845,360 (Jensen et al.), where numerous messages represented by multiple frequency code signals are incorporated to produce and encoded audio signal. Each of the above-mentioned patents is incorporated by reference in its entirety herein. When the ancillary codes are detected in device 103, they may be transmitted for further processing and identification for the purposes of producing research data for reports.

In another embodiment, research data comprises audio signatures (also known as audio "fingerprints") that are generated in portable user devices 105-107. The audio signatures are comprised of features extracted from the audio itself using a time-frequency analysis, mainly performed through Fourier transforms or alternately wavelet transforms. In the latter case, a combination of Fast-Fourier Transformation (FFT) and Discrete Cosine Transformation (DCT) may be used. Examples of suitable audio fingerprint configurations are disclosed in U.S. Pat. No. 5,436,653 (Ellis, et al.), WO Patent Publication No. 02/11123, titled "System and Methods for Recognizing Sound and Music Signals In High Noise and Distortion" and WO Patent Publication No. 03/091990, titled "Robust and Invariant Audio Pattern Matching." Each of these documents is incorporated by reference in its entirety herein. When audio signatures are formed in portable computing device 103, they also may be transmitted remotely for further processing and matching to identify the broadcast for the purposes of producing research data for reports.

The ancillary codes and audio signatures are applicable to a wide variety of platforms, such as broadcasts and streaming media; the only requirement is that the media data contain an audio portion that can be audibly reproduced. In the event that computer-based, non-audio media data is presented, the device presenting media data (e.g., computer 103) has the option of forwarding research data to any of portable computing devices 105-107, or transmitting the research data (e.g., through network 109), together with a linked portable computer device (105-107) identification number to a remote server for processing. One example of research data relating to computer-based non-audio media data is a "cookie", also known as an HTTP cookie, which can provide state information (memory of previous events) from a user's browser and return the state information to a collecting site, which may be a content source, collection server, or both. The state information can be used for identification of a user session, authentication, user's preferences, shopping cart contents, or anything else that can be accomplished through storing text data on the user's computer. When setting a cookie, transfer of content such as Web pages follows the HyperText Transfer Protocol (HTTP). Regardless of cookies, browsers request a page from web servers by sending a HTTP request. The server replies by sending the requested page preceded by a similar packet of text, called "HTTP response". This packet may contain lines requesting the browser to store cookies. The server sends lines of Set-Cookie only if the server wishes the browser to store cookies. Set-Cookie is a directive for the browser to store the cookie and send it back in future requests to the server (subject to expiration time or other cookie attributes), if the browser supports cookies and cookies are enabled. The value of a cookie can be modified by sending a new Set-Cookie: name=newvalue line in response of a page request. The browser then replaces the old value with the new one. Cookies can also be set by JavaScript or similar scripts running within the browser. In JavaScript, the object document.cookie is used for this purpose.

Various cookie attributes can be used: a cookie domain, a path, expiration time or maximum age, "secure" flag and "HTTPOnly" flag. Cookie attributes may be used by browsers to determine when to delete a cookie, block a cookie or whether to send a cookie (name-value pair) to the collection site 121 or content site 125. With regard to specific "cookies", a session cookie may be used, which typically only lasts for the duration of users using the website. A web browser normally deletes session cookies when it quits. A session cookie is created when no expires directive is provided when the cookie is created. In another embodiment, a persistent cookie (or "tracking cookie", "in-memory cookie") may be used, which may outlast user sessions. If a persistent cookie has its Max-Age set to 1 year, then, within the year, the initial value set in that cookie would be sent back to a server every time a user visited that server. This could be used to record information such as how the user initially came to the website. Also, a secure cookie may be used when a browser is visiting a server via HTTPS, ensuring that the cookie is always encrypted when transmitting from client to server. An HTTPOnly may also be used. On a supported browser, an HTTPOnly session cookie may be used for communicating HTTP (or HTTPS) requests, thus restricting access from other, non-HTTP APIs (such as JavaScript). This feature may be advantageously applied to session-management cookies.

Turning back to FIG. 1, portable computing devices 105-107 are communicatively coupled or "paired" to collector 108 and network 109. In this embodiment, collector 108 is a computer processing device that that is capable of wirelessly communicating with any of portable computing devices 105-207, preferably via a Bluetooth connection, and further communicating through network 109 to one or more remote servers 110. It should be understood by those skilled in the art that network 109 is not limited to any single network, and may include a plurality of networks that allow computer and telephone-based communication to take place through appropriate software and interfaces known in the art. Portable computing devices 105-107 may communicate to network 109 (as well as remote server(s) 110) through collector 108, or independently via respectively dedicated wireless connections (e.g., CDMA, OFDM, LTE, etc.). In one embodiment, as portable computing devices 105-107 receive and/or produce research data, they forward the research data directly to collector 108, which is located in the vicinity of portable computing devices 105-107 (e.g., in a household). Under a preferred embodiment, portable computing devices 105-107 transmit research data and communicate with collector 108 via a Bluetooth connection, utilizing a specialized security protocol.

Figure 2:
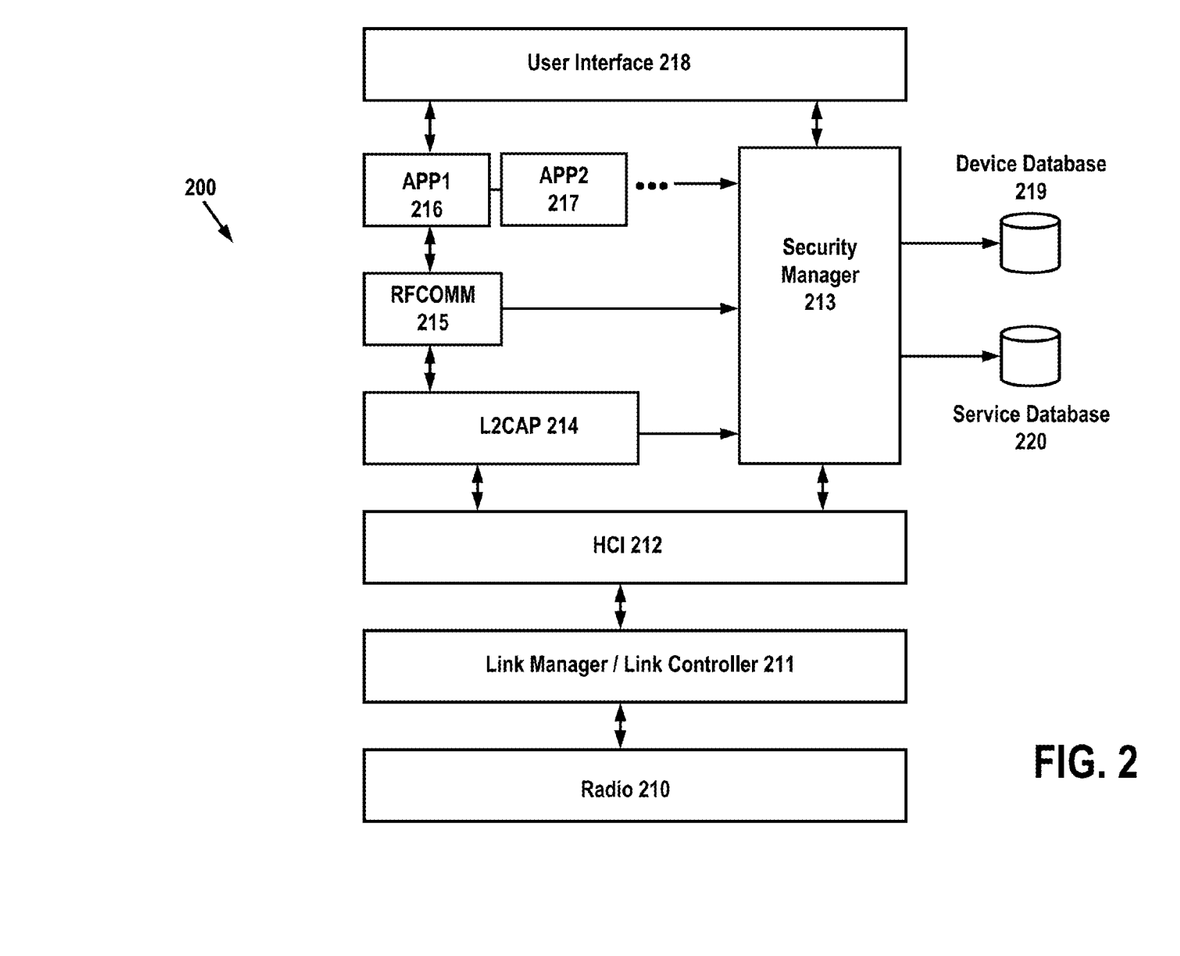
FIG. 2 illustrates a security management configuration for the transfer to research data.

FIG. 2 shows an exemplary security management configuration for communication among portable computing devices 105-107 and collector 108. The configuration is particularly useful for pairing and bonding devices to collector 108. Generally speaking, two devices become paired when they start with the same PIN and generate the same link key, and then use this key for authenticating at least the present communication session. The session can exist for the life of a L2CAP link or the life of an ACL link. Pairing can occur through an automatic authentication process if both devices already have the same stored PIN from which they can derive the same link keys for authentication. Alternatively, either or both applications can ask their respective users for manual PIN entry.

Once devices are paired they can either store their link keys for use in subsequent authentications or discard them and repeat the pairing process each time they connect. If the link keys are stored, then the devices are bonded, enabling future authentications to occur using the same link keys and without requiring the user to input the PIN again. Bonding can expire immediately after the link is disconnected, after a certain time period expires, or never (permanently bonded). When bonding expires, the devices must go through the pairing process again.

In FIG. 2, an exemplary security management configuration is illustrated, that is preferably incorporated into the host software package. For greater flexibility, authentication and authorization can occur after determining the security level of the requested service; in this case, authentication occurs after the ACL link is established. Of course, other authentication can occur with initial establishment of the ACL link. In FIG. 2, security manager 213 resides on the Bluetooth host and communicates with L2CAP 214 and with link manager/controller 211 through host control interface 212. Typically, a connect request from another device arrives at L2CAP 214, where L2CAP requests evaluation from security manager 213. Security manager 213 looks up the requested service in database 220 for security information, and looks the requesting device's BD_ADDR or International Mobile Equipment Identity (IMEI) number in database 219 for access authorizations. Security manager 213 then begins the necessary authentication and (if needed) encryption procedures with the link manager 211 through HCI 212. If authentication is determined to be positive, link manager 211 provides a response through HCI, and L2CAP 214 finishes the connection setup process. The security manager architecture in FIG. 2 could be used to implement link-level (Mode 3) security as well.

The configuration of FIG. 2 preferably implements basic security operations primarily at the link manager/controller 211 levels. Link controller 211 can implement the key-generating algorithms, the random number processes, and the basic communication of the various security parameters between devices. Link manager 211 provides a set of commands that enable the formation of link management protocol packets containing the security parameters. HCI 212 provides a means for the host to communicate security items to the Bluetooth module for use by the link manager controller 211. At the link layer, there may be several different entities used to maintain security. A PIN can be used as either a fixed number, preprogrammed into the Bluetooth unit, or a number that's entered by the user at the beginning of each secure session. There are several ways that two devices can be provided the same PIN: if two devices are being set up to exchange files, then each can ask its respective user for a password, in which a common PIN is derived from the link keys. In another embodiment, a Bluetooth-equipped device is set up with user accounts comprising a database of BD_ADDR/IMEI values and associated PIN codes. The security manager can enter these via an encrypted Bluetooth link or through an ordinary cable connection. When a device attempts to connect, the application asks for a PIN (or retrieves one that was previously stored), from which the link keys are derived. If the user's PIN matches, then both devices create the same link key and authentication and, if needed, encryption can proceed successfully. Under one embodiment, the PIN may be associated with a user rather than with the device.

An authentication key, which also may operate as a link key, is typically 128 bits long and is used by one device to insure that the other device is who it claims to be. The link key can either be temporary, where it is used for one session only (i.e., devices not bonded), or semi-permanent in which it is stored and used for several sessions or over a time period (i.e., devices bonded). Stored link keys are semi-permanent because they can be either changed or removed at a later time. As a result, paired and/or bonded devices can derive and store a new link key during each session if desired. The link key may be used to generate encryption keys, such as initialization keys, unit keys, combination keys and master keys. An initialization key is used as a link key when two devices first connect. It is normally created only once and used to protect the generation and transfer of other keys that are more secure than the initialization key. A unit key is on that is associated with a single Bluetooth device that has limited resources and can't store a large number of keys. This key is typically generated once and is almost never changed. A combination key is derived from inputs provided by both devices on a Bluetooth link and is considered more secure than a unit key. Unlike unit keys, a combination key is unique to a pair of devices, and not just one device. A master key is temporary and is used for the generation of an encryption key for broadcasting packets to multiple slaves. An encryption key may be used in a streaming algorithm to change plain text into cipher text and vice versa. The key can be as short as 8 bits and as long as 128 bits.

Referring briefly back to FIG. 1, embodiments will be described (FIGS. 3A-4) where portable computing devices 105-107 collect audio codes and securely forward them via a Bluetooth connection to collector 108. Server 110 will be described in terms of a web portal or gateway (e.g., Content Management System) that communicates through network 109 to obtain data from multiple collectors that may be dispersed in a geographic area. Portable computing devices 105-107 are also equipped to communicate wirelessly to network 109 using known wireless communication techniques (e.g., GPRS). Collector 108 may communicate with web portal 110 via dial-up modem, wired Ethernet, WiFi, or some other type of cellular connection (e.g. 3G or 4G cellular).

In one embodiment, portable computing devices 105-107 are identified by their IMEI number, where each portable computing device uses a 15-digit IMEI number, and the 15th digit of the IMEI is configured as a check of the first 14 digits. Portal 110 may be configured supply only the first 14 digits of the meter's IMEI to the collector 108. In this case, collector 108 will calculate the 15th digit for consistency. Collector 108 may be configured in advance to work with portable computing devices recognized for an area (e.g., household), but such a configuration is not essential for operation. In the absence of pre-programmed parameters (e.g., during initialization) or when parameters are found to have become corrupted, portable computing devices 105-107 will preferably create default parameters that will cause each to: (a) attempt to connect to web portal 110 over cellular GPRS at boot, and then at predetermined times (e.g., once per hour) until directed to do otherwise; network access are preferably defined using the APN/PIN and a default URL stored in data file parameters (".dat"), and (b) attempt to find and communicate with collector 108 at boot, using existing in-home Inquire results. During initialization, a portable computing device, having provisioned cellular communications and an activated SIM card, will communicate with portal 110 to retrieve settings, scripts, firmware, and to upload logs. Afterwards, a portable computing device searches via Bluetooth for a collector for a predetermined period of time (referred to as Bluetooth interval or "BINT"). Once a collector is found, the wireless connection is preferably ceased.

Figure 3A:
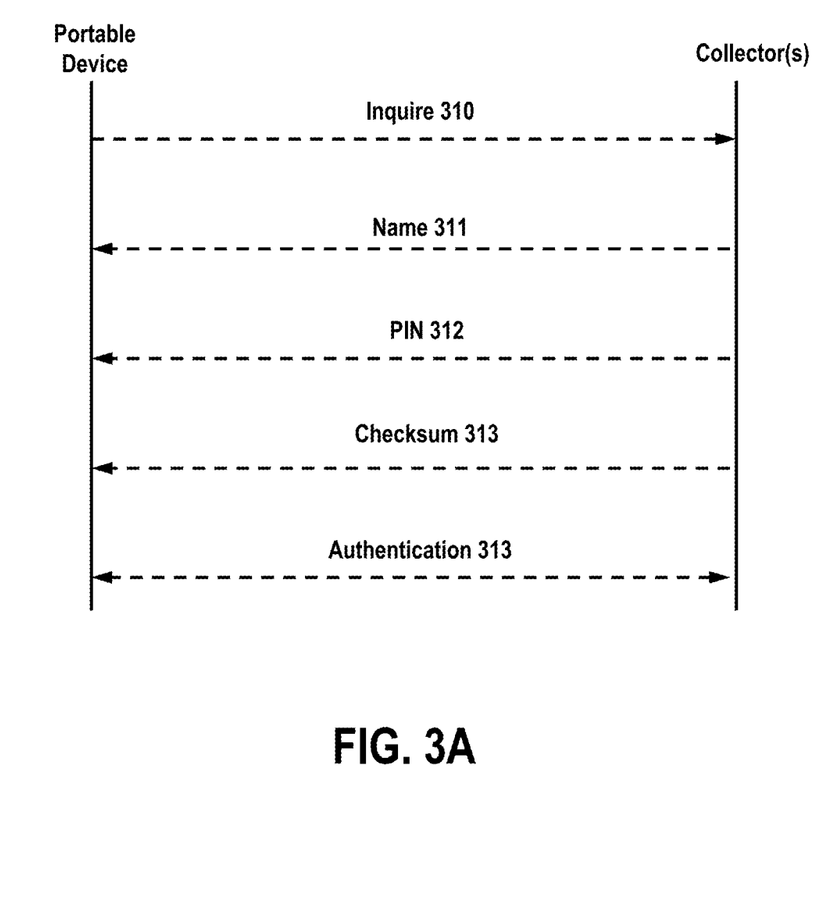
FIG. 3A illustrates a process flow between a portable computing device and collector for identifying the collector and authentication.

To find collector(s) 108 Bluetooth "in-home" beacon detection algorithm is performed, where a Bluetooth inquire is executed, preferably at boot time, for a predetermined BINT (e.g., 300 secs.). The inquire results returned contain any devices found with a profile, where "friendly" name prefixes are considered potential beacons. The friendly name strings and their associated Bluetooth addresses are further processed using a hashing algorithm to determine whether they are beacons. If no collector has been identified, or in the event that a previously authenticated collector has been marked as failed, the portable computing device will attempt to identity potential collectors by searching the inquire string returned by the in-home detection for friendly names beginning with a predetermined prefix (e.g., "AGC"). The "collector friendly" name strings are preferably encoded using a hashing algorithm, where the hashing mechanism makes use of a default secret "skeleton key" hard-coded into the portable computing device and the collector. In addition to the predetermined prefix, an exemplary decoded "collector-friendly" name may contain a PIN required to pair with a collector and a proprietary checksum value of the PIN, used to verify that the friendly name is authentic. The process flow diagram of FIG. 3A summarizes an exemplary inquiry process, where portable device performs an inquire 310 which returns a name 311 from a collector, which is followed by a PIN 312 and checksum 313. Once authenticated 313, the portable device and collector are paired and may be bonded for further communication.

Under one embodiment, the PIN may be changed periodically by the collector. Once all collectors have been identified, a portable computing device will attempt to further authenticate each in turn by following an Initialization Authentication Procedure (IAP) described below in connection with FIG. 3B. After a portable computing device has successfully authenticated a collector and the collector has successfully authenticated the portable computing device, they are paired to each other as "home" devices, where the portable computing device stores the home collector's Bluetooth address for future use, along with a secondary key given by the home collector. The skeleton key will continue to be used to decode the pairing PIN from the friendly name and to re-execute the IAP in the event the home collector is replaced, while the secondary key is used to generate session authentication files in the Session Authentication Procedure (SAP) to allow transferred data to be trusted.

After a PIN is extracted from the friendly name using the techniques described above, all further transactions between the collector and portable computing device should be encrypted using link keys generated while pairing with the PIN, as defined by the Bluetooth protocol. Bluetooth file transfer of research data is preferably initiated by the portable computing device. In this case, the collector acts as a Bluetooth Object Exchange (OBEX) FTP server to retrieve files and an OBEX push server to receive files. The portable computing device acts as a Bluetooth OBEX FTP client and Push client. All file transfers will be encrypted as described above.

The IAP process is performed in the configuration of FIG. 1 to bind the portable computing device with a home collector (i.e., the collector that has been configured to work with a specific portable computing device), to authenticate the portable computing device with the collector, and vice versa, and to transfer a secondary secret key to the portable computing device. Under a preferred embodiment. The IAP is performed during an idle period in the portable computing device, such as when the portable computing device is charging, and should be completed within a single BINT session. Also, if a portable computing device has not yet succeeded in authenticating a home collector, it will begin an IAP process to find a suitable connection. If a portable computing device fails relative to its home collector, it will start the IAP with any potential home collectors at the next BINT interval, provided that the portable computing device is charging. Once the portable computing device has identifies and authenticates its home collector, it will cease attempts to identify potential home collectors and only attempt to communicate with the home collector using a Session Authentication Procedure (SAP.)

Figure 3B:
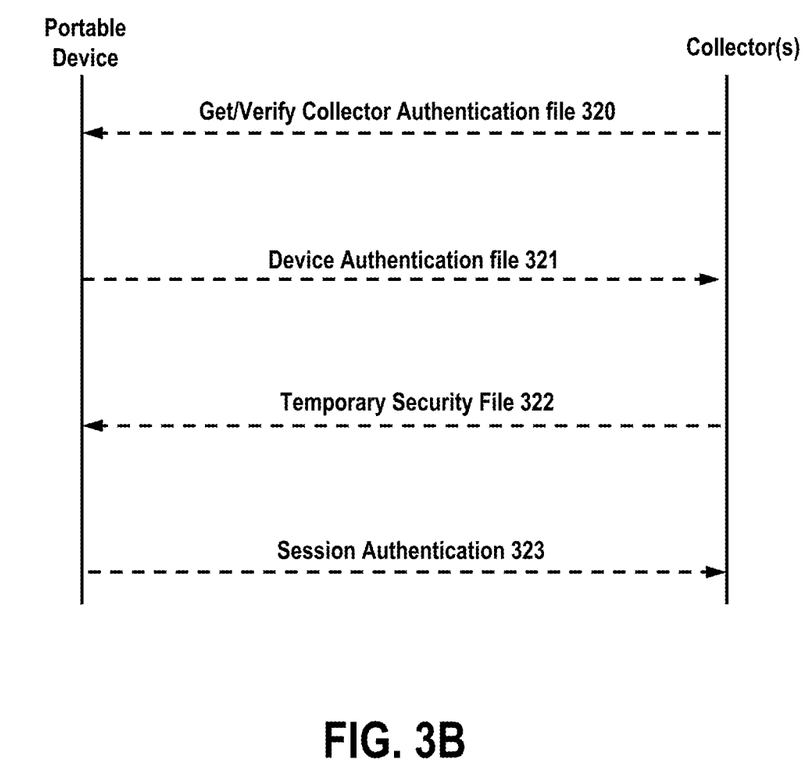
FIG. 3B illustrates a process flow between a portable computing device and collector for media session authentication.

An exemplary Initialization Authentication Procedure (IAP) is illustrated in FIG. 3B. In 320, a portable computing device downloads and verifies a Collector Initial Authentication (CIA) file. The portable computing device will attempt to transfer the Collector Initial Authentication (CIA) file. The CIA file is generated upon request from a random salt, the Skeleton Key, a password, the portable computing device's IMEI and the current PIN using a hashing algorithm. Once the CIA file has been downloaded and verified or rejected, it is preferably deleted. If no files are downloaded, then the portable computing device does not belong to this collector, or the collector has not yet been configured to work with this portable computing device. Once the CIA is verified, the portable computing device uploads an Initial Authentication (MIA) file 321 back to the collector to allow it to authenticate the portable computing device. Under a preferred embodiment, the MIA file should have a format similar to "IMEI_YYYYMMDDhhmmss MIA" to identify portable computing device number (IMEI), year, month data and time. The MIA file is generated by combining the retrieved random salt from the CIA, a password, the skeleton key, the IMEI, and the PIN using a hashing algorithm. The portable computing device should preferably delete the MIA file after uploading it to the collector.

The collector verifies the MIA file, and then generates a temporary Secondary Secret (SS) file 322 by combining a random salt, a randomly generated secondary secret key (the actual secondary secret being transferred) and a checksum. The secondary secret key is preferably stored in non-volatile memory by the collector. This secondary secret acceptance file is the current secret and will be used as part of the SAP process. Once the SS file has been downloaded and verified by the portable computing device, it is preferably deleted, but the secondary secret key itself may be stored in the portable computing device's non-volatile memory. The portable computing device downloads the SS file for a predetermined period of time (e.g., once a second, for up to 10 seconds). The portable computing device verifies the SS file, and then uploads a portable computing device session Authentication (MSA) file.

Once the SS file has been retrieved and validated by the portable computing device, the portable computing device will immediately upload a Portable Computing Device (ore "Meter") Session Authentication (MSA) (using Session Application Procedure described below) to the collector 323, but perform no further action. Upon receipt of the MSA file, the collector will validate the file against the SS and exit IAP mode for this portable computing device. The normal session timer will not be started in this situation and no further files will be accepted or processed by the collector. The portable computing device preferably deletes the MSA file after uploading to the collector. The MSA file is preferably generated using the random salt received with the SS file, the secondary secret key, the portable computing device IMEI, a password and the PIN, or some combination of these. The MSA will also contain the current portable computing devices version and revision, and will be hashed for security.

Figure 4:
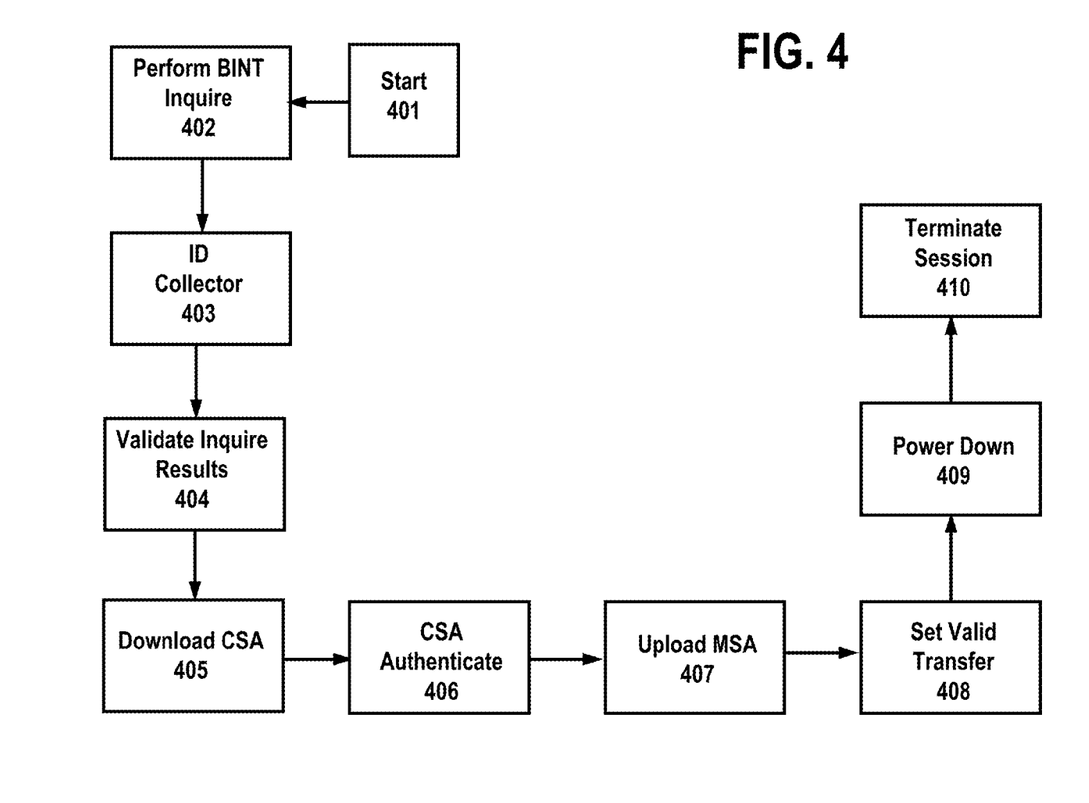
FIG. 4 illustrates an exemplary process for a session authentication procedure between a portable computing device and collector.

An exemplary Session Authentication Procedure (SAP) is illustrated in FIG. 4, where the SAP is used to signal the beginning of a communication session between the portable computing device and its home collector, and to further authenticate the portable computing device with the collector, and vice versa. At the start 401 of an exemplary SAP process, a BINT inquire is performed 402, where one or more home collectors are identified 403. The portable computing device discovers and validates the PIN 404 preferably using the same algorithm from the IAP. Once validated, portable computing device attempts to download authentication (MIA) files that may be contained in a folder, which prompts the collector to generate a Collector Session Authentication (CSA) file (e.g., "AGC.CSA") 405. The CSA file may comprise a random salt, a password, a Secondary Secret key, portable computing device IMEI and PIN, or some subset thereof, which is preferably hashed for security. The CSA file will allow the portable computing device to authenticate 406 the collector using the previously stored SS keys and extract the random salt used as the session key. If the CSA file is not valid, the portable computing device may terminate the session.

If the CSA file is validated, the portable computing device will upload a Portable Computing Device (or "Meter") Session Authentication (MSA) file 407 before uploading any other files. This allows the collector to verify the portable computing device, and signals the beginning of a new session at the collector. Similar to the MIA file, the MSA file may have a name such as "IMEI_YYYYMMDDhhmmss MSA", where the file comprises a hash of the random salt received for the CSA file, which is now the session key, the Secondary Secret Key, the portable computing device IMEI, a password and the PIN, or some combination of these. The MSA will also contain the current para-portable computing devices version ("PTAG") and para-portable computing device revision, and will be preferably hashed.

Any files transferred to the collector for a predetermined time (e.g., up to 30 minutes) after the session authentication file has been received from the portable computing device is considered valid by the collector 408, as long as this collector is able to authenticate the portable computing device using the content of the MSA file. If the MSA file is not valid, files transferred will be accepted, but deleted, and no ACK will be placed in the acknowledge directory. After performing any other required operations, the portable computing device may power down the Bluetooth chipset 409 and terminate the session 410. The collector can also time out the session after a predetermined time period, or may terminate the session after the last file in the updates folder has been retrieved.

For data maintenance purposes, a portable computing device may mark a home collector as "failed" if (1) the portable computing device has been unable to find its home collector in the Bluetooth inquire results for a predetermined period of time (e.g., 24 hours), (2) the portable computing device doesn't see the its home collector in the inquire results, but does see one or more validated potential home collectors, and this condition happens consistently every BINT cycle for a predetermined period of time (e.g., 1 hour), or (3) the portable computing device finds its home collector in the inquire results, schedules a communication session, but then fails to download and validate the CSA file, and this happens over a predetermined number of cycles (e.g., 3 times in a row). Whenever the portable computing device fails its home collector, the portable computing device will resume IAP when charging in the presence of a validated potential (new) home collector. Also, whenever the portable computing device fails its home collector, it will resume attempts to connect directly to the portal via cellular GPRS, and continue such attempts on its normal GPRS schedule, until a home collector has been found.

Each collector 108 may operate in several states. In the "uninitialized" state, the collector indicates that it has not been initialized by the portal. In this state, a Bluetooth beacon will not be turned on and portable computing devices will not be able to discover it. In a "normal" state, the collector establishes a friendly name and may change this name using random strings, so that a different secure name appears after each attempt to connect to the portal, and where a new PIN may be encoded for use while pairing, hashed with the skeleton key. In the event of a "failure" condition, and if the Bluetooth connection is operational, a friendly name may be generated that indicates the condition.

The protocols for downloading files from the collector are varied, but one exemplary configuration is provided below. For download authentication, portable computing devices must be authenticated for the Bluetooth PIN-based encryption, described above. In addition, the portable computing devices should not be able to process any downloaded files if they are unable to authenticate the collector using the Collector Session Authentication file (CSA). Each collector preferably contains multiple directories for each portable computing device for downloading, and contain the following file types, discussed in greater detail above:

Collector Initial Authentication (CIA)
Secondary Secret (SS)
Collector Session Authentication (CSA)

Additional file type may include Parameter Script (PS), Command Script (CS), Firmware Updates (FWU), Timehack (UTC time), and Acknowledgement (ACK). The different file types may be contained in their own separate directory, or combined in a single directory. In one embodiment, the CS, FWU and UTC files may be combined in one directory for ease of processing.

When performing a download file check, the parameter script (PS), command script (CS) and firmware updates (FWU) files may include a 16-bit cyclic redundancy check (CRC) included as 4 hex digits in the file name. The specific CRC algorithm should be identical to that used in the portal. Thus, if the CRC matches the downloaded file, the portable computing device generates an execution log file (PEL, CEL, and FEL, discussed below). The CIA, SS and CSA files should be configured to have an intrinsic file check as part of an authentication hashing algorithm. UTC and ACK directory files preferably contain only one byte of value 0x00, so there will be no need to perform a file check, and the file name itself indicates the time (UTC) generally, or a time in which a file is acknowledged.

As mentioned above, the PEL, CEL and FEL files are execution log files for the PS, CS and FWU files, respectively. These files are uploaded to a collector to acknowledge a successful download, and to inform the portal of the results. The names of the uploaded files should have time/date stamps that are identical to the downloaded file name, and should have a file extension that relates to the type of file downloaded (e.g., PS→PEL, CS→CEL, FWU→FEL). This allows the collector to easily pair uploaded execution logs with a specific downloaded file. Under a preferred embodiment, PEL files should have the same format as existing CEL files.

With regards to timing, the collector should preferably download command script (CS) files before the portable computing device and use it to establish a connection. In the event the collector downloads a new CS file before the portable computing device downloads a current CS file, the collector has the option of merging the two CS files into one file. In the case where two CS files are merged before the portable computing device acknowledged the old CS file, the collector may be configured to handle this situation, where the following example illustrates an exemplary sequence:
1) The collector downloads CS file from portal (TS1_CRC4.CS);
2) A portable computing device downloads CS file (TS1_CRC4.CS) from collector, creates a CEL file (IMEI_TS1.CEL) for upload on next session;
3) Panelist leaves home;
4) Next session interval occurs—no contact is made with the collector;
5) More session intervals occur—still no contact;
6) The collector downloads new CS file from portal, and merges with existing CS file (TS2_CRC4.CS);
7) Panelist returns home;
8) Next session interval occurs and portable computing device connects with collector and uploads original CEL file (IMEI_TS1.CEL);
9) The collector receives this file (IMEI_TS1.CEL), and name doesn't match (TS2_CRC4.CS); collector doesn't delete CS file;
10) A next download interval occurs, and portable computing device downloads the new merged file (TS2_CRC4.CS), and creates updated CEL file (IMEI_TS2.CEL);
11) A next session interval occurs, portable computing device connects with collector and uploads next CEL (IMEI_TS2.CEL).
12) The collector receives CEL (IMEI_TS2.CEL), the name matches CRC file (TS2_CRC4.CS), so collector deletes CS file.

Accordingly, the collector can receive CEL files that don't match, and continue with securely connecting to portable computing devices. However, the collector still needs to keep track of portable computing device parameters in the PS file and PTAG values that document the current version of these parameters on the portable computing device. The PTAG changes whenever the CS received from the portal contains commands to SET parameters. In the above scenario, the PTAG would change at step 6, and not sync up again until step 11. This would cause the collector to generate a new CS comprising the current PS block at step 7, as it would appear to be invalid even though it would become valid by step 11.

To avoid the above under one embodiment, the collector may continue to merge CS files for download by the portable computing device, but will also maintain a time-sequenced index of received CS files that contain parameter altering SET commands, with the PTAG as the key. The SET commands from each CS will then be stored in a temporary location and will not immediately update the PS file. The PS file will be updated with the content of the CS file matching an uploaded CEL file, along with all CS files received prior to that uploaded CEL file, with the update occurring in the order received. Thus, when a portable computing device connects, the PTAG in the index will be compared against the version received in the MSA file to prevent PS-to-CS file generation.

With regard to the uploading of files, the Bluetooth FTP process does not necessarily provide for a dedicated destination directory. Thus, files transferred to the collector from all portable computing devices should be named uniquely and identify the portable computing device in the filename. The exemplary list below provides file types that may be uploaded to a collector, either via portal, or from a portable computing device:
Portable Computing Device Initial Authentication (MIA);
Portable Computing Device Session Authentication (MSA)
Research Data Logs (PPM)
Command Script Execution Logs (CEL)
Parameter Script Execution Logs (PEL) (same format as CEL file);
Firmware Update Execution Logs (FEL)—used to acknowledge firmware update file;
Network Connection Logs (NCL); and
Bluetooth Connection Logs (BCL)—new type The NCL and BCL files may or may not be uploaded to the portal, and CEL, PEL, and FEL preferably have identical internal file formats. If the portal doesn't upload the filename, PEL, CEL, and FEL files appear similarly to the portal. Furthermore, CEL, PEL, and FEL files also may serve as a download ACK.

Similar to the discussion above, MIA and MSA filenames may have an exemplary name format such as "IMEI_YYYYMMDDhhmmss.<file extension>". The IMEI is preferably 15 characters, and the file extension is a maximum of 3 characters, so the final file name is a maximum of 34 characters. MIA and MSA files will have an intrinsic file check as part of authentication. All other upload filenames preferably take the exemplary form "IMEI_CRC4MMDDhhmmss.<file extension>". In other words the CRC4 takes place of the year, so that the max file length is still 34 characters. For all other uploaded files, the portable computing device will write the 16-bit CRC in the filename characters that correspond to the year, (i.e. IMEI_CRC4MMDDhhmmss.<file extension>). The collector will check the contents of the uploaded file and compare the calculated CRC to the CRC in the uploaded filename. The specific CRC algorithm should be identical to that used by the portal.

If the CRC matches, the collector will strip off the last two CRC bytes, ACK the uploaded file to the portable computing device, and then queue the file for upload to the portal. If the CRC in the uploaded file doesn't match, the collector may simply delete the file and wait for the portable computing device to upload the file again. In one embodiment, the MIA and MSA files are not acknowledged (ACK) by the collector. However, all other files uploaded by the portable computing device will be acknowledged by the collector. Since the Bluetooth interface is limited to FTP file transfers initiated by the portable computing device, the upload ACK should take the form of a file. Specifically, there will be a separate ACK download directory for each portable computing device. The ACK from the collector to the portable computing device will be a file with the identical name as the uploaded file. The contents of the ACK file will be 1 byte with a value of 0x00. When the portable computing device downloads the ACK file, it will delete its local copy of the corresponding uploaded file on the portable computing device. Uploaded files that aren't acknowledged will be re-uploaded by the portable computing device on the next session. When the portable computing device uploads the MSC file, this signals a new session, and the collector will delete all ACK files for the previous session. This means the portable computing device must download the ACK directory sometime before uploading the MSC file.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A computer-implemented method for securely receiving research data relating to media data exposure, comprising:
    verifying, at a collector that is separate from a portable computing device and a collection server and that is to transfer media exposure research data from the portable computing device to the collection server, validity of second authentication information obtained from the portable computing device based on first authentication information obtained from a network server, the second authentication information including identification information associated with the portable computing device;
    sending session authentication information to the portable computing device when the second authentication information is valid, wherein the session authentication information defines a research data transfer session that is valid over a defined period of time; and
    transferring the media exposure research data from the portable computing device to the collection server during the research data transfer session.

2. The computer-implemented method of claim 1, wherein the identification information associated with the portable computing device includes a file name including an identification number unique to the portable computing device.

3. The computer-implemented method of claim 1, wherein the second authentication information includes one of a random salt, a key, a password or a personal identification number (PIN).

4. The computer-implemented method of claim 3, wherein the second authentication information is hashed.

5. The computer-implemented method of claim 1, wherein the research data includes one of (i) codes detected from audio, (ii) audio signatures or (iii) web cookies.

6. The computer-implemented method of claim 1, wherein the first authentication file is received from a web portal on the network server.

7. The computer-implemented method of claim 1, further including associating the media exposure research data received during the research data transfer period with the portable computing device and transmitting the media exposure research data to a portal on the collection server for audience research data processing.

8. A computer-implemented method for securely communicating media exposure research data from a portable computing device utilizing Bluetooth communication, the method comprising:
    verifying a collector initial authentication (CIA) file from a collector that is separate from the portable computing device and a collection server, the collector to transfer media exposure research data from the portable computing device to the collection server;
    when the CIA file is verified, sending to the collector a portable computing device initial authentication (MIA) file including identification information associated with the portable computing device;
    after sending the MIA file, verifying at the portable computing device a key from the collector; and
    sending media exposure research data stored on the portable computing device to the collector using a research data transfer session that begins when a collector session authentication (CSA) file from the collector is validated.

9. The computer-implemented method of claim 8, wherein the identification information associated with the portable computing device includes a file name including an identification number unique to the portable computing device.

10. The computer-implemented method of claim 8, wherein at least one of the CIA file or the MIA file includes one of a random salt, a key, a password or a personal identification number (PIN).

11. The computer-implemented method of claim 10, wherein the CIA file and the MIA file are hashed.

12. The computer-implemented method of claim 8, wherein the media exposure research data includes one of (i) codes detected from audio, (ii) audio signatures or (iii) web cookies.

13. The computer-implemented method of claim 12, wherein the codes are based on multiple-frequency code signals detected from an acoustic audio signal.

14. The computer-implemented method of claim 12, wherein the audio signatures are based on features of audio identified using a time-frequency analysis.

15. The computer-implemented method of claim 8, wherein the CIA file is received from a web portal.

16. An apparatus for transferring media exposure research data from a portable computing device to a server, the apparatus comprising:
    a processor that is separate from the portable computing device and the server; and
    a memory in communication with the processor and including instructions that, when executed, cause the processor to:
        verify validity of second authentication information obtained from the portable computing device based on first authentication information obtained from a network entity, the second authentication information identifying the portable computing device;
        send session authentication information to the portable computing device when the second authentication information is valid, the session authentication information defining a research data transfer session that is valid over a defined period of time; and
        transfer the media exposure research data from the portable computing device to the server during the research data transfer session.

17. The apparatus according to claim 16, wherein the second authentication information is an international mobile equipment identity of the portable computing device.

18. The apparatus according to claim 17, wherein the first authentication information is only a portion of digits of the international mobile equipment identity.

19. The apparatus according to claim 18, wherein the instructions cause the processor to verify the validity of the second authentication information by determining a digit of the international mobile equipment identity that is not present in the portion of the digits of the international mobile equipment identity not included in the first authentication information.

20. The apparatus according to claim 16, wherein the processor is to receive the second authentication information from the portable computing device using Bluetooth communications.

* * * * *